United States Patent
Crouch

(10) Patent No.: US 8,166,182 B2
(45) Date of Patent: *Apr. 24, 2012

(54) SYSTEM AND METHOD FOR COMMUNICATING WITH AN ELECTRONIC EXCHANGE IN AN ELECTRONIC TRADING ENVIRONMENT

(75) Inventor: Neil P. Crouch, Cary, IL (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/282,137

(22) Filed: Oct. 26, 2011

(65) Prior Publication Data

US 2012/0041836 A1 Feb. 16, 2012

Related U.S. Application Data

(63) Continuation of application No. 12/849,251, filed on Aug. 3, 2010, now Pat. No. 8,073,958, which is a continuation of application No. 11/693,312, filed on Mar. 29, 2007, now Pat. No. 7,809,841.

(51) Int. Cl.
*G06F 15/16* (2006.01)
*G06Q 40/00* (2006.01)
(52) U.S. Cl. .................................. 709/227; 705/37
(58) Field of Classification Search .......... 709/200–230; 705/1, 28, 26–27, 56, 35–37, 44, 10
See application file for complete search history.

(56) References Cited

U.S. PATENT DOCUMENTS

| | | | |
|---|---|---|---|
| 6,105,005 | A | 8/2000 | Fuhrer |
| 6,289,382 | B1 | 9/2001 | Bowman-Amuah |
| 6,772,132 | B1 | 8/2004 | Kemp, II et al. |
| 6,938,011 | B1 | 8/2005 | Kemp, II et al. |
| 7,107,240 | B1 | 9/2006 | Silverman et al. |
| 7,127,424 | B2 | 10/2006 | Kemp, II et al. |
| 7,228,289 | B2 | 6/2007 | Brumfield et al. |
| 7,389,268 | B1 | 6/2008 | Kemp, II et al. |
| 7,562,045 | B2 | 7/2009 | Beadle et al. |
| 7,610,239 | B1 | 10/2009 | Silverman et al. |
| 7,809,841 | B1 | 10/2010 | Crouch |
| 7,987,246 | B2 | 7/2011 | Tsuji et al. |
| 2002/0198813 | A1* | 12/2002 | Patterson et al. ............. 705/36 |
| 2003/0220989 | A1 | 11/2003 | Tsuji et al. |
| 2005/0108142 | A1 | 5/2005 | Beadle et al. |
| 2006/0085317 | A1 | 4/2006 | Allen |
| 2008/0114671 | A1* | 5/2008 | Goel et al. ................... 705/37 |
| 2010/0299223 | A1 | 11/2010 | Crouch |

* cited by examiner

*Primary Examiner* — Joseph Avellino
*Assistant Examiner* — Mark O Afolabi
(74) *Attorney, Agent, or Firm* — McDonnell Boehnen Hulbert & Berghoff LLP

(57) ABSTRACT

System and methods for a connection proxy server are described. According to an example method described herein, a connection proxy server stores subscription, product tables as well as other downloads that are provided to a client terminal during initialization stage as well as later during a trading session. Upon detecting that a connection between the client terminal and a gateway is lost, the connection proxy maintains a communication session created for the client terminal at the gateway and receives data intended for the client terminal. If the connection is re-established between the client terminal and the gateway during a predetermined period of time, the connection proxy provides the stored data to the client terminal thus avoiding a surge in processing resources at the gateway due to the necessary downloads.

17 Claims, 7 Drawing Sheets

SYSTEM AND METHOD FOR COMMUNICATING WITH AN ELECTRONIC EXCHANGE IN AN ELECTRONIC TRADING ENVIRONMENT

CROSS REFERENCE TO RELATED APPLICATIONS

The present application is a continuation of U.S. patent application Ser. No. 12/849,251, filed Aug. 3, 2010, now U.S. Pat. No. 8,073,958, and entitled "System and Method for Communicating with an Electronic Exchange in an Electronic Trading Environment," which is a continuation of U.S. patent application Ser. No. 11/693,312, filed Mar. 29, 2007, now U.S. Pat. No. 7,809,841, and entitled "System and Method for Communicating with an Electronic Exchange in an Electronic Trading Environment."

TECHNICAL FIELD

The present invention is directed towards electronic trading. More specifically, the present invention is directed to tools for an improved remote connection in an electronic trading environment.

BACKGROUND

Electronic trading is generally based on a host exchange, one or more computer networks, and client devices. Subscribing traders are connected to an exchange's electronic trading platform by way of communication links to facilitate real-time electronic messaging between themselves and the exchanges. The electronic trading platform includes at least one electronic market, which is at the center of the trading system and handles the matching of bids and offers placed by the traders for that market. The electronic messaging includes market information that is distributed from the electronic market to the traders via an electronic data feed. Once the traders receive the market information, it may be displayed to them on their trading screens. Upon viewing the information, traders can take certain actions including the actions of sending buy or sell orders to the electronic market, adjusting existing orders, deleting orders, or otherwise managing orders. Traders may also use software tools on their client devices to automate these and additional actions.

Although the types of market information published by an electronic exchange may differ from market to market, there are generally some standard pieces of information. Market information may include data that represents just the inside market. The inside market is the lowest available ask price (best ask) and the highest available bid price (best bid) in the market for a particular tradeable object at a particular point in time. Market information may also include market depth. Market depth refers to quantities available at the inside market and may also refer to quantities available at other prices away from the inside market. In addition to providing order book information, such as order price and quantity information, electronic exchanges can offer other types of market information such as the open price, settlement price, net change, volume, last traded price, the last traded quantity, and order fill information.

While there are often built-in redundancies in an electronic trading network, it is not uncommon that network connections between the communicating devices, such as a gateway and client devices, may occasionally go down. If that unintentionally happens, a connection between the devices normally has to be restored. This reconnection process can cause a surge in usage of processing resources (especially at the gateway device) due to a need by the receiving device to receive the dropped market information, as well as possible subscription and initialization data. By having to reestablish the subscription, receive products tables and dropped market information to the remote device that lost its connection, the reconnection process may cause larger overall network problems that can impact other users of the network whose connection was not dropped. This can result in undesirable delays in the delivery of new market information to those other users.

It would therefore be beneficial to provide a method and system for an improved data delivery during reconnection as well as other events that may cause restarting of data flow to remote devices.

BRIEF DESCRIPTION OF THE DRAWINGS

Example embodiments are described herein with reference to the following drawings, in which.

SUMMARY

According to example embodiments described herein, system and methods are provided for an improved remote connection in an electronic trading environment. To illustrate the present invention and aspects thereof, the following description, including the figures and detailed description, provides examples that can be used or readily modified by one of ordinary skill to generate a system or method that benefits from the teachings described and claimed herein.

In a remote host trading environment where a client terminal communicates with a gateway via a remote host, a connection proxy may be located at the remote host. According to an example embodiment, when the connection is being established between the client terminal and the gateway to enable a trader to trade at an electronic exchange, the connection proxy stores product table, login information, subscription data as well as other data downloads that are provided to the client terminal at the initialization stage. When the connection link is created between the client terminal and the gateway, the connection proxy may start monitoring the established connection and store additional data being sent to the client terminal. Upon detecting that the communication link is dropped between the client terminal and the gateway due to network problems or yet for some other reason, the connection proxy maintains the established communication sessions established for the client terminal at the gateway.

Upon detecting that the communication link has been disconnected, the connection proxy may also store additional data intended for the client terminal, such as fills or order status data. According to one example embodiment, the connection proxy may maintain the communication sessions created at the gateway for the client terminal as well as data stored for the client terminal for a predetermined period of time after the connection is lost. If the connection is restored during the predetermined period of time, the connection proxy may provide the stored data to the client terminal so that there is no need to obtain the necessary downloads from the gateway. Then, if the connection is not restored during the predetermined period of time, the connection proxy may release the communication sessions created for the client terminal at the gateway and discard any data stored for the client terminal.

Other features of the present invention will become more apparent to persons having ordinary skill in the art to which the present invention pertains from the following description and claims.

DETAILED DESCRIPTION

I. A First Example Trading System

Figure 1:
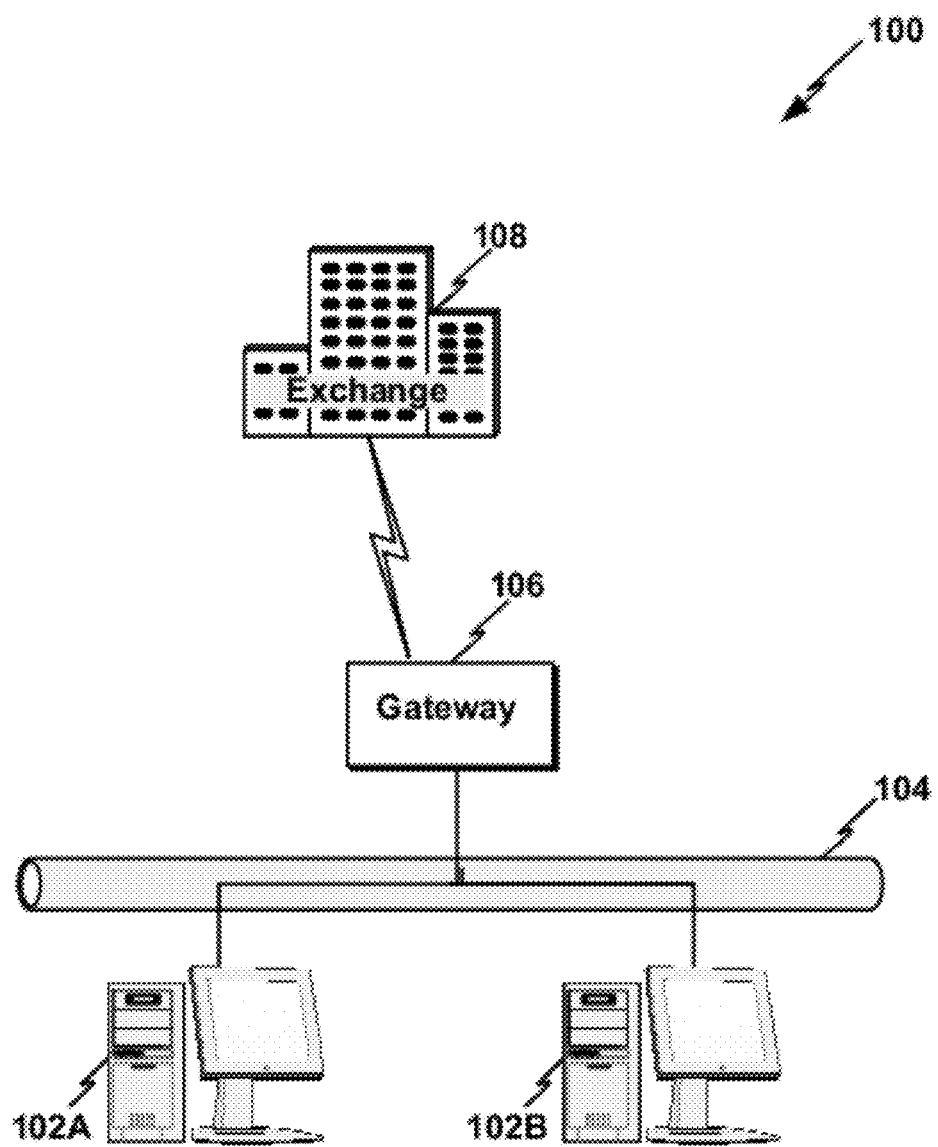
FIG. 1 is a block diagram illustrating an example electronic trading system in which a client terminal and a gateway device are on a local area network.

FIG. 1 illustrates an example electronic trading system 100 in which the example embodiments may be employed. The example system 100 comprises trading stations 102A and 102B that access an electronic exchange 108 through a gateway 106. As illustrated in FIG. 1, the trading stations 102A-B and the gateway 106 are located within a local LAN 104, although other configurations are possible. While not shown, a router could be used to route messages between the gateway 106 and the electronic exchange 108. The electronic exchange 108 includes a computer process (e.g., the central computer) that matches buy and sell orders sent from the trading stations 102A-B with orders from other trading stations (not shown). The electronic exchange 108 may list one or more tradeable objects for trading. While not shown in FIG. 1 for the sake of clarity, the trading system may include other devices that are specific to the client site like middleware and security measures like firewalls, hubs, security managers, and so on, as understood by persons skilled in the art.

Regardless of the types of order execution algorithms used, the electronic exchange 108 provides market information to the subscribing trading stations 102A-B. Market information may include data that represents just the inside market. The inside market is the lowest sell price (best ask) and the highest buy price (best bid) at a particular point in time. Market information may also include market depth. Additionally, the exchange 108 can offer other types of market information such as the last traded price (LTP), the last traded quantity (LTQ), and order fill information.

The computer employed as the trading stations 102A-B generally can range from a hand-held device, laptop, or personal computer to a larger computer such as a workstation and multiprocessor. An illustrative personal computer may use Pentium™ microprocessors and may operate under a Windows operating system, or yet may use some other microprocessor or operating system. Generally, the trading stations 102A-B includes a monitor (or any other output device) and an input device, such as a keyboard and/or a two or three-button mouse to support click based trading, if so desired. One skilled in the art of computer systems will understand that the present example embodiments are not limited to any particular class or model of computer employed for the trading stations 102A-B and will be able to select an appropriate system.

In one example embodiment, the trading stations 102A-B use software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, a trading station could run automated types of trading applications.

The example embodiment may be implemented in relation to any type of trading screen, therefore, details regarding the trading screen are not necessary to understand the present invention. However, in one embodiment, one type of trading screen that can be used is provided by a commercially available trading application referred to as X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale.

Portions of the X_TRADER® and the MD Trader™-style display are described in U.S. Pat. No. 6,772,132, entitled "Click Based Trading With Intuitive Grid Display of Market Depth," filed on Jun. 9, 2000, U.S. Pat. No. 6,938,011, entitled "Click Based Trading with Market Depth Display" filed on Jun. 9, 2000, U.S. Pat. No. 7,127,424 entitled "Click Based Trading With Intuitive Grid Display of Market Depth and Price Consolidation," filed on Oct. 5, 2001, U.S. patent application Ser. No. 10/125,894, now U.S. Pat. No. 7,389,268, entitled "Trading Tools For Electronic Trading," filed on Apr. 19, 2002, and U.S. patent application Ser. No. 10/376,417, now U.S. Pat. No. 7,228,289, entitled "A System and Method for Trading and Displaying Market Information in an Electronic Trading Environment," filed on Feb. 28, 2003, the contents of each are incorporated herein by reference. However, it should be understood that orders in the system illustrated in FIGS. 1 and 2 could also be placed using any other trading application as well. Additionally, the preferred embodiments are not limited to any particular product that performs translation, storage, and display function.

The computer employed as the gateway 106 generally can range from a personal computer to a larger or faster computer. An illustrative gateway computer may use Pentium™ microprocessors and may operate under a Windows (server or workstation) operating system, or yet some other system. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system. Additionally, in some instances, a gateway, such as gateway 106, may not even be necessary and/or another type of network intermediary device may be employed.

It should be noted that a computer system that may be employed here as a trading station or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

Memory on either the gateway 106 or the trading station 102 may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, any other physical medium, memory chip or cartridge, or any other medium from which a computer can read.

It should also be noted that the trading stations 102A-B generally execute application programs resident at the trading stations 102A-B under the control of the operating system of the trading station. Also, the gateway 106 executes application programs resident at the gateway 106 under the control of the operating system of the gateway 106. In other embodiments and as understood by a person skilled in the art, the function of the application programs at the trading stations 102A-B may be performed by the gateway 106, and likewise, the function of the application programs at the gateway 106 may be performed by the trading stations 102A-B.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example, the gateway device may be located at the client site along with the trading station, which is usually remote from the matching process at the electronic exchange. According to another example, the gateway device may be located at the exchange side. As such, the present invention is not limited to any actual network configuration.

According to the illustrated embodiment, the trading stations 102A-B, the gateway 106, and any routers communicate over the LAN 104, and the gateway 106 may communicate with the matching process at the electronic exchange 108 over a T1, T3, ISDN, or some other high speed connection. In another example illustration, the client site may be located on the actual grounds of the electronic exchange (for example, in the building of the exchange). According to this instance, the trading station and the gateway may still communicate over a LAN, but if any routers are used, they may communicate with the matching process at the electronic exchange through another connection means besides a T1, T3, or ISDN. In yet another example illustration, the gateway may be housed at, or near, its corresponding electronic exchange. According to this instance, the trading station may communicate with the gateway over a wide area network or through the use of a T1, T3, ISDN, or some other high speed connection.

While a single exchange is shown in FIG. 1, it is understood that a trader may obtain access and trade at multiple electronic exchanges. In such an embodiment, a client terminal could access multiple exchanges through multiple gateways, with each gateway designated for a specific exchange. Alternatively, a single gateway may be programmed to handle more than one electronic exchange.

It could be very valuable to provide a trader with the opportunity to trade tradeable objects listed at different electronic exchanges. For example, a trader could view market information from each tradeable object through one common visual display. As such, price and quantity information from the two separate exchanges may be presented together so that the trader can view both markets simultaneously in the same window. In another example, a trader can spread-trade different tradeable objects listed at the different electronic exchanges. Regardless, the present invention is not so limited.

Figure 2:
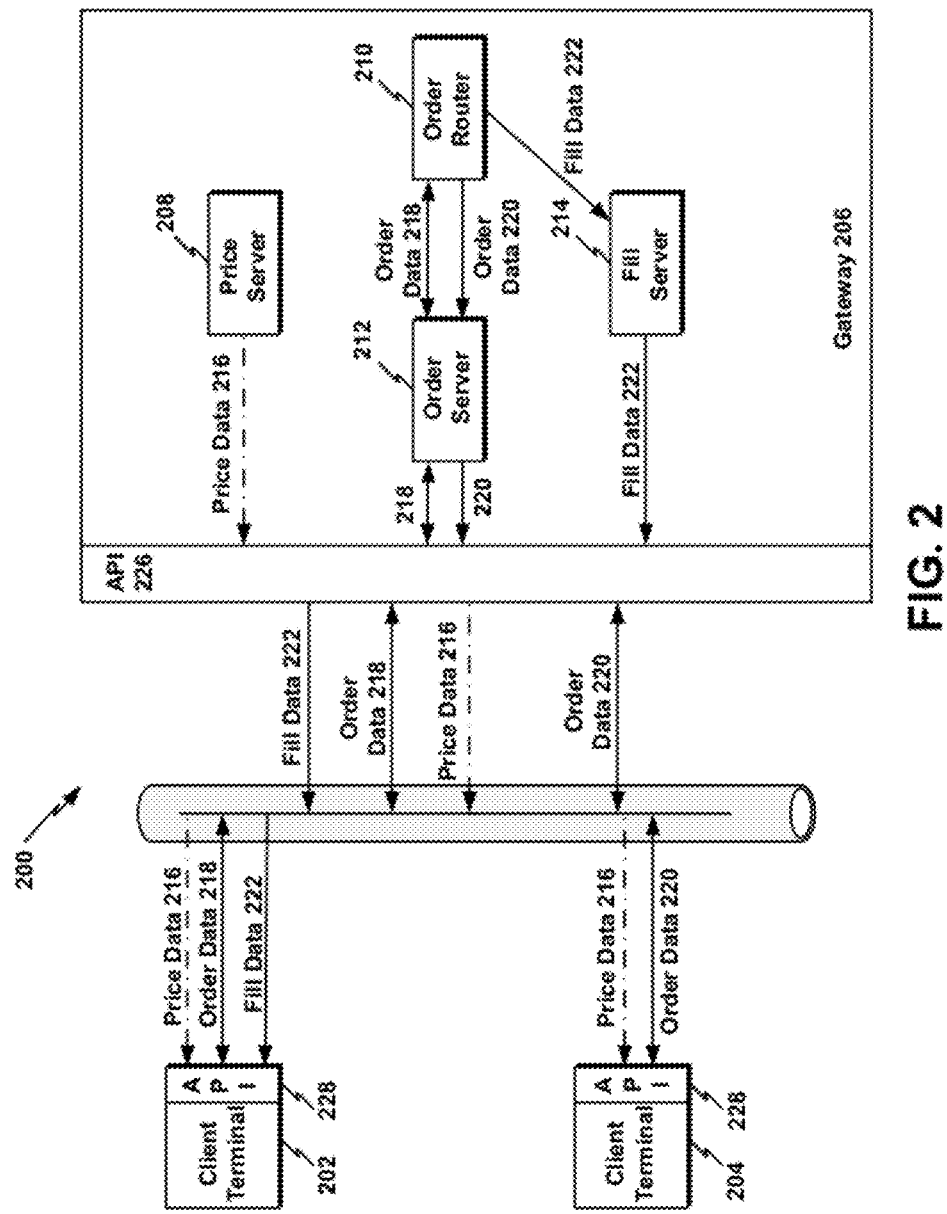
FIG. 2 is a block diagram illustrating an example electronic trading system providing an overview of how price, order and fill information are communicated to and from a client terminal and a gateway device.

FIG. 2 is a block diagram of a system 200 illustrating one example method for providing and receiving price, order and fill information to and from a client terminal and a gateway. The system 200 includes two client terminals 202 and 204 and a gateway 206. The gateway 206 includes a price server 208, an order server 210, an order router 210, and a fill server 214. The two client terminals also include client application programming interfaces (APIs) 228 that are used to connect to a gateway API 226. An API is a source code interface that a computer system or program library provides in order to support requests for services etc. to be made of it by a computer program. According to one example, the API 226 allows a client terminal to communicate with an exchange and translate the communication into a format accepted at the exchange. It should be understood that the gateway 206 could include additional components as well.

Upon initiating a login to the gateway 206, API connections are created between the client terminals 202 and 204 and the gateway 206. According to one example embodiment, order and fill communications may use inbox communication, with inbox messages sent between the two entities over point-to-point communication links. In such an embodiment, an API inbox is created on the gateway API 226 for each client terminal to communicate with the order server 210, and another API inbox is created on the gateway API 226 for each client terminal to communicate with the fill server 214. An inbox, as used herein, defines a unique address on the system and allow one application to communicate directly with and to send point-to-point data to another application without other application receiving that data.

Additionally, API inboxes could also be created on each client terminal to create API point-to-point connections for communication with the order server 210 and the fill server 214. The client terminals also subscribe to a group API inbox at the price server 208 to receive price data provided by an exchange via the price server 208.

Once communications are established with the gateway 206, each client terminal 202 and 204 receives product tables from each selected exchange so that a trader can subscribe to products that the trader is interested to trade. A product table may include symbols for each tradeable object being traded at an electronic exchange, a type of each tradeable object, a point value, currency, tick tables, price formats, a numerator and a denominator for calculating tick sizes, and other parameters. Once the client terminal receives the product table, a trader selects one or more tradable objects to trade, or for which the trader wishes to receive market information, thus, creating a subscription profile to be used at the gateway 206 for communication with the client terminal. The gateway 206 then uses the stored subscription profiles to forward desired market information to the client terminals 202 and 204.

Generally, the gateway 206 receives market data feeds including price, order information, etc., using multicast channels or yet some other transmission methods, such as unicast, depending on the type of data being provided in a data feed. As known in the art, multicast communication is based on a group concept, where a group of subscribers, such as a group of gateways or client terminals, express an interest in receiving a particular data stream (defined by a multicast group address) from a source, such as exchange market data from an exchange. Unlike multicast, unicast communication involves sending data over a network from a single sender to a single receiver.

With respect to price data feeds, the client terminals 202 and 204 may subscribe to receive market information corresponding to some but not all tradeable objects provided by an exchange. In such an embodiment, the gateway 206 may be programmed to send only price data for tradeable objects that the client terminals 202 and 204 are subscribed to receive.

Unlike price data, orders and order confirmations (personal information) are often sent using separate unicast channels. Thus, with respect to two client terminals 202 and 204 shown in FIG. 2, two separate unicast channels 218 and 220 are used for order data communication between the terminals 202 and 204 and the order server 212 as well as the order router 210 at the gateway 206. Similarly, all fill data is sent to a client terminal that initiated a respective trade order via a unicast channel created between the client terminal and the gateway 206. For example, one such communication is shown with respect to the fill server 214 sending fill order data 222 to the client terminal 202.

According to one example embodiment, when a price data feed is received and processed at the price server 208, price data is sent via multicast to a designated multicast group address, as shown at 216. In such an embodiment, all client terminals, here client terminals 202 and 204, subscribing to that specific multicast address on the LAN will receive the price data 216. A port may be assigned at the client terminals 202 and 204 to listen to multicast price data. With respect to unicast communication, separate ports could be assigned for receipt of fill data and order data at the client terminal. In such an embodiment, the fill server 214 and the order server 212 send fill and order data to the predetermined ports at the client terminals.

II. A Second Example Trading System

Figure 3:
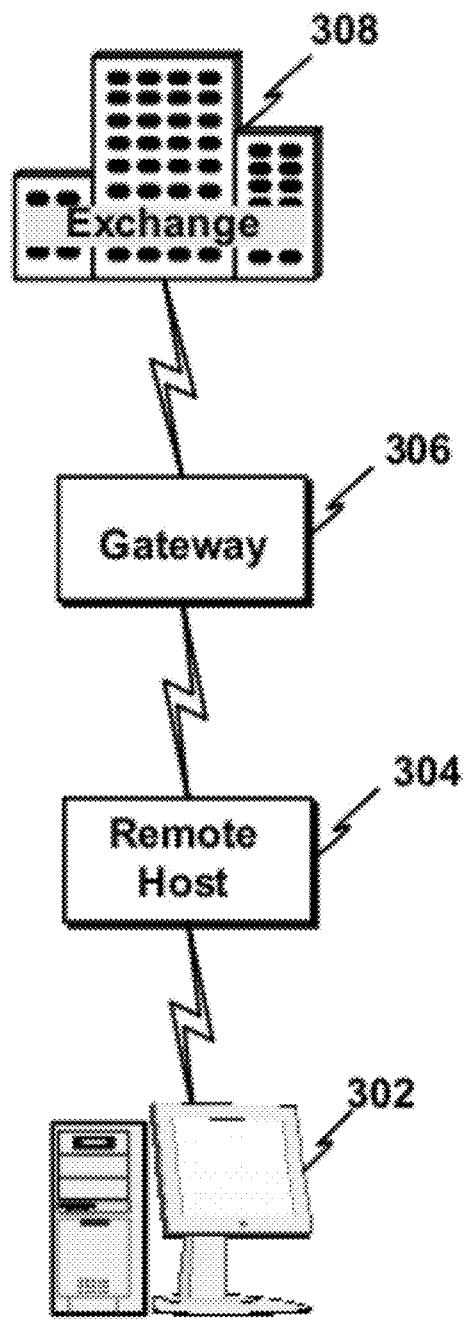
FIG. 3 is a block diagram illustrating an example electronic trading system in which a client terminal communicates with a gateway device through a remote host.

The second method that is can be used to connect network segments in an electronic trading environment is a remote connection. FIG. 3 illustrates an example electronic trading system 300 in which a trading station is located remote from a gateway. The example system 300 comprises a remote trading station 302, a remote host 304, a gateway 306, and an exchange 308. A trader connecting in a remote mode connects to the gateway 306 via the remote host 304 via the Internet or through a direct connection. Example connections between the remote trading station 302 and the remote host may include an ISDN, cable, DSL, or a leased line connection. The remote host 304 and the gateway 306 may communicate via a LAN, for example.

In the remote mode of operation, the remote trading station 302 may initiate a connection to the remote host 304 by establishing a Transmission Control Protocol ("TCP") session. Though different protocols could be used as well. When data arrives at the remote host 304 from the gateway 306, the remote host 304 sends the data to the remote trading station 302 via the established TCP connection.

Figure 4:
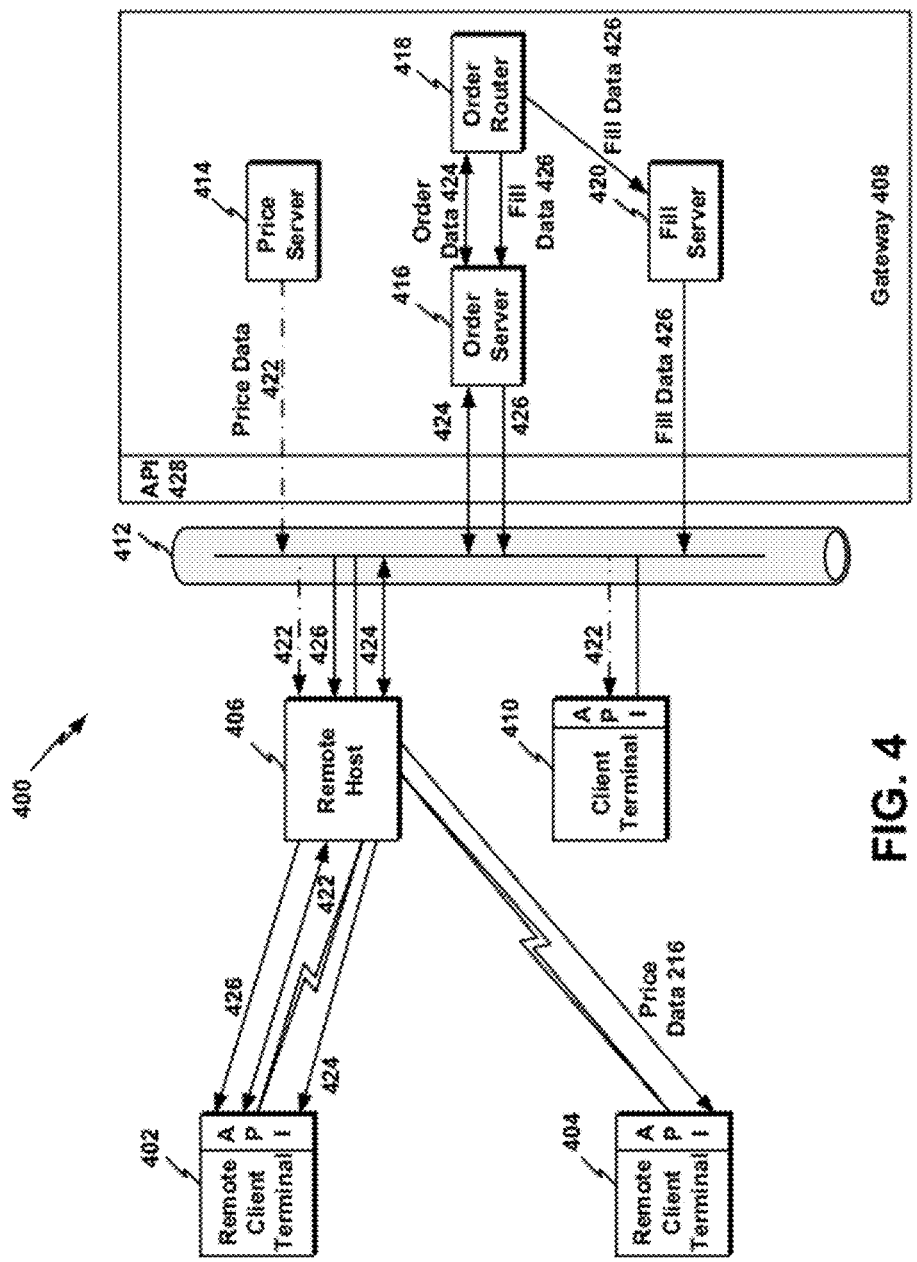
FIG. 4 is a block diagram illustrating an example electronic trading system providing an overview of how price, order, and fill information are communicated to and from a remote client terminal via a remote host.

FIG. 4 is a block diagram of a system 400 illustrating an example method for providing and receiving price, order and fill information to and from a client terminal and a gateway in a remote host electronic trading environment. The system 400 includes two remote client terminals 402 and 404, a remote host 406, and a gateway 408. Just to give an example of a system that combines both local and remote communication systems, the system 400 illustrates a local trading station 410 that communicates with the gateway 408 via a LAN 412. Similar to the system illustrated in FIG. 2, the gateway 408 includes an API 428. However, rather than creating API connection between the gateway 428 and the remote client terminals, API connections are created to and from the remote host 406 that communicates data to the remote client terminals 402 and 404.

The gateway 408 includes a price server 414, an order server 416, an order router 418, and a fill server 420. The gateway 408 could include additional components as well. In a remote connection trading environment, the price server 414 sends price data 422 to the remote host 406 via multicast using a multicast address. The remote host 406 is configured to listen to the multicast and receive the price data 422 just like any other subscribing trading station located on the LAN, such as the trading station 410. Then, the remote host 406 forwards the received price data to each subscribing remote client terminal, such as the terminals 402 and 404, via a separate TCP connection created for each client terminal.

In a trading environment using a remote connection to a trading network, orders are submitted at the remote client terminals 402 and 404. The client terminals 402 and 404 may then create order messages and send the order messages to the remote host 406 via a TCP connection, such as shown at 424 with respect to client terminal 402. Upon receiving an order message, the remote host 406 forwards the order message to the order server 416 using a unicast connection. At this point, the order information is passing through the local LAN. Once the order server 416 receives the order message, it sends the order message to an electronic exchange. Also, the order server 416 sends an order confirmation back to the remote host 406, and the host 406 then forwards the confirmation to the remote client terminal 402 (or 404) via the TCP connection.

When a fill is sent to the gateway 408 in a remote electronic trading environment, the fill confirmation is created at the fill server 420 and the order server 416, and it is sent from the gateway 408 to the remote host 406 as shown at 426. Once the fill confirmation is received at the remote host 406, the host 406 forwards it to the remote client terminal 402 via a TCP connection. While not specifically described, it should be understood that the remote host 406 may repackage any messages that are received from and sent to the remote client terminals 402 and 404. Similarly, the servers at the gateway 408 may process and change format of messages or other data that are received from and sent to an electronic exchange and client terminals.

While two example trading systems have been described above, it should be understood that different network connections are possible, and the present invention is not limited to the described example systems. For example, a trading system could be configured to use Wide Area Networks (WAN) and WAN routers or wireless networks. One skilled in the art of electronic trading systems will understand that the present embodiments are not limited to the particular configurations illustrated and described with respect to FIGS. 1-4, and will be able to design a particular system based on the specific requirements (for example, by adding additional exchanges, gateways, trading stations, routers, or other computers serving various functions like message handling and security). Additionally, several networks, like either of the networks shown in FIGS. 1-4, may be linked together to access one or more electronic exchanges.

III. Example Connection Proxy Systems

Regardless of the extent of data provided by an exchange, when a connection between a client terminal and a gateway or a remote host goes down unintentionally, the lost connection must be restored at some later time. However, as mentioned earlier, using a conventional configuration the reconnection causes a surge in resources available at the gateways and hosts due to the market and client-related downloads that have to restart upon the reconnection. This in turn causes problems to other local or remote users who may experience delays in the receipt of market and order data from the gateways or hosts that are in the process of restarting connections with other client terminals.

According to one example embodiment, client terminals, remote hosts and/or gateways may include status applications that monitor and manage network connections that are created between them. Such applications typically use general status messages or heartbeat messages to monitor the status of each network connection. For example, a status application at a remote host could be programmed to receive periodical heartbeat messages from a status application at a client terminal via a TCP connection. In such an embodiment, upon detecting a predetermined number of missed heartbeats, the remote host detects that the connection has been lost.

Alternatively, the remote host may detect that a connection has been dropped upon attempting to send data to a client terminal and receiving an error message. Upon detecting that a TCP connection has been lost, in a typical remote host network configuration, the remote host would terminate API connections to a gateway and then initiate a reconnection process upon reestablishing a TCP connection to the client terminal.

Similarly, in relation to the LAN trading environments, a status application at a gateway may receive heartbeats directly from a status application at a client terminal. When the status application at the gateway detects that a predetermined number of consecutive heartbeats are not received from the client terminal, the connection is considered to be terminated and a price/order/fill servers at the gateway are notified of the lost connection. Upon detecting that a connection has been lost, in a typical LAN trading environment, the servers terminate any API connections created for the client terminal and release any inboxes and communication resources reserved at the servers for communication of data to and from the client terminal.

In a current network environment, all necessary subscription data downloads, product table downloads, as well as fill and trade order related downloads are to be restarted for a client terminal upon a reconnect even when a disconnect occurs for a few seconds or a few minutes. The example embodiments described below are directed to an improved system and methods for communication in a trading environment that minimize the effect of reconnection downloads.

Figure 5:
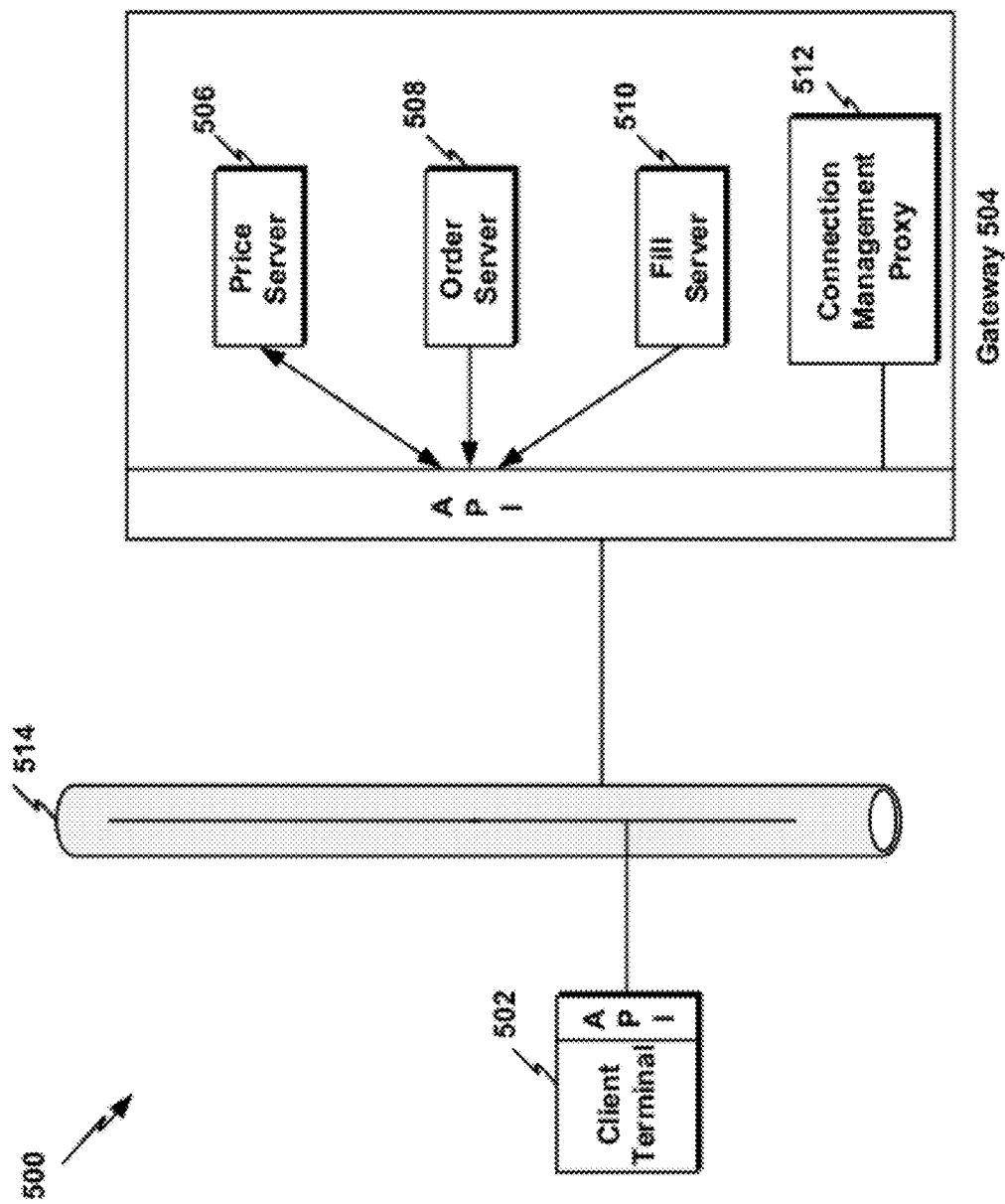
FIG. 5 is a block diagram illustrating an example system for an improved communication system using a connection proxy in a local area network trading environment.

FIG. 5 is a block diagram illustrating an example system 500 for an improved communication system using a connection proxy in a local area network trading environment.

The example system 500 includes a client terminal 502, a gateway 504 having a price server 506, an order server 508, and a fill server 510, and a connection management proxy 512, all of which communicate via a LAN 514. Similarly to the block diagrams illustrated earlier, it should be understood that fewer or additional network entities or components could also be used, but are not illustrated for the sake of clarity.

The client terminal 502, the gateway 504, as well as the gateway components have been described in relation to the preceding figures. According to one example embodiment, the connection management proxy 512 is a network entity that monitors a connection between the client terminal 502 and the gateway 504, manages the release of network resources stored at the gateway 504 for the client terminal 502, as well as stores and provides necessary downloads to the client terminal 502 upon the reconnect. While the connection management proxy 512 is illustrated as a network entity at the gateway 504, the connection management proxy 512 could instead be positioned elsewhere in the network, but in communication with the gateway 504. Further, alternatively, some elements of the connections management proxy 512 could be in communication with the gateway 504 while other elements or functions to be performed by the proxy 512 could be internally located at the gateway 504.

When a connection is established between the client terminal 502 and the gateway 504, all necessary downloads occur to allow a trader at the client terminal 502 to connect to an exchange and to trade selected tradeable objects that are provided at the exchange. The downloads, among others, may include a subscription table listing information of related to all products selected by a trader for trading, a product table listing all available products and product definitions, a fill download from the last fill sequence received, a full order book listing current orders in the market, a market depth snapshot with up to date depth levels so that the client terminal is ready to receive only depth updates. It should be understood that the data downloads that occur at the client terminal may depend on an exchange selected by a trader for trading, and the data downloads may be exchange or gateway specific.

When the necessary downloads are being provided to the client terminal 502, the connection management proxy 512 is configured to receive the data in the data downloads and store the intercepted data in its internal database for later use. The connection management proxy 512 could be programmed to only receive the data downloads that would be necessary upon the reconnect. However, it should be understood that different embodiments, dependent on the system configuration, are possible as well.

Alternatively, rather than receiving the data downloads when they are sent to the client terminal 502, the connection management proxy 512 may receive some downloads at some earlier or later time. For example, at the beginning of a trading day, the connection management proxy 512 may request all data downloads that could potentially be used at client terminals, and the received downloads could be stored internally at the proxy 512. Such an embodiment may be used in relation to a product table download, and the product information stored at the connection management proxy 512 may be updated as new products are added during a trading day or other products are taken out from the product list.

Once the connection is established between the client terminal 502 and the gateway 504, and all the necessary downloads are finalized, the connection management proxy 512 starts monitoring the established connection for potential communication problems. To do that, the connection management proxy 512 may monitor heartbeat messages that are sent from the client terminal 502. However, alternative methods could also be used, such as sending some other messages and getting an error message in response.

Upon detecting that a connection between the client terminal 502 and the gateway 504 has been lost, the connection management proxy 512 prevents the release of API connections as well as other session resources created for the client terminal 502 at the gateway 504. To do that, in an environment where heartbeat messages are used, the connection management proxy 512 may generate heartbeat messages on behalf of the client terminal 502 and may send the heartbeat messages to a status application at the gateway 504. However, different embodiments are possible as well.

During the period when the connection between the client terminal 502 and the gateway 504 is lost, the connection management proxy 512 may receive data on behalf of the client terminal 502 and store the received data for later delivery to the client terminal. According to one example embodiment, the connection management proxy 512 may monitor for any data to be sent to an IP address of the client terminal 502 and store the data internally for later use at the client terminal 502 upon restoration of the connection during a preset time period. For example, the data that may be received at the proxy 512 on behalf of the client terminal 502 may include fills, new product tables, order updates, depth snapshots, price subscription details, as well as login information.

According to one example embodiment, the connection management proxy 512 is programmed to maintain session resources on behalf of the client terminal 502 for a preset period of time. In such an embodiment, if the reconnect does not occur during the predefined period, the connection management proxy 512 sends a signal to the gateway 504 to release any connection resources, such as API connections and inboxes, created for the client terminal 502 at the gateway 504. In the embodiment described above using heartbeat messages, the connection management proxy 512 may simply stop sending heartbeat messages on behalf of the client terminal 502 to a status application located at the gateway 504. However, it should be understood that different embodiments could be used as well.

When the connection between the client terminal 502 and the gateway 504 is reestablished, such as for example, when the connection management proxy 512 detects heartbeat messages being sent from the client terminal 502 during the predefined period of time, the connection management proxy 512 sends the stored data to the client terminal 502. First, the connection management proxy 512 sends subscription data that is necessary for the client terminal 502 to communicate with the gateway 504 and to send orders to one or more exchanges. Then, depending on the system configuration, the connection management proxy 512 may provide to the client terminal 502 any remaining data that was stored at the connection management proxy 512 while the connection was lost. Such data may include order related data, such as order confirmation, fills, etc., and other types of data described above.

Figure 6:
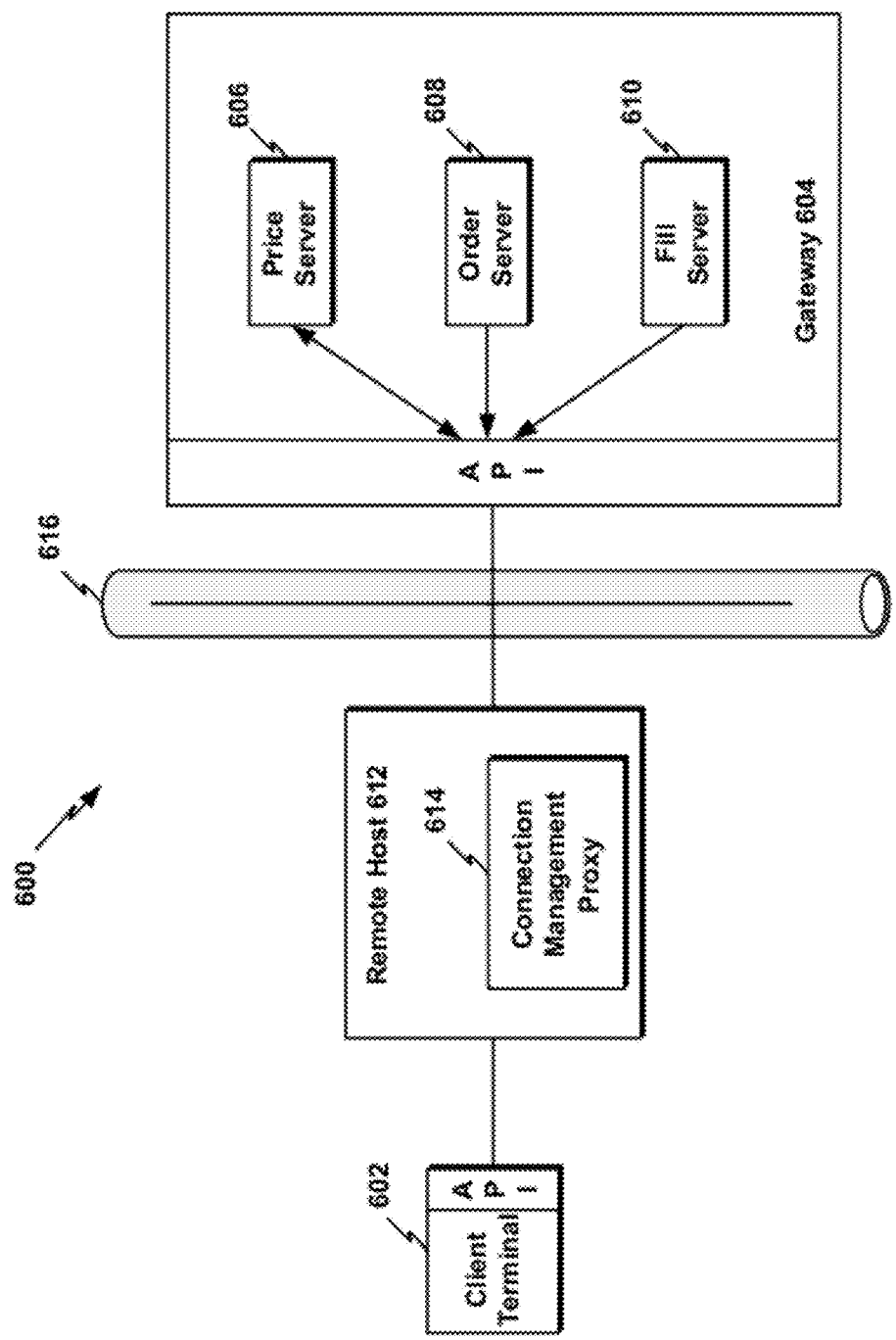
FIG. 6 is a block diagram illustrating an example system for an improved communication system using a connection management proxy in a trading environment where a client terminal is located remote from a gateway.

FIG. 6 is a block diagram illustrating an example system 600 for an improved communication system using a connection management proxy in a trading environment where a client terminal is located remote from a gateway.

The example system 600 includes a client terminal 602, a gateway 604 having a price server 606, an order server 608, and a fill server 610. The system also includes a remote host 612 that communicates with the gateway via a LAN 616. The remote host 612 includes a connection management proxy 614. While FIG. 6 illustrates the connection management proxy 614 at the remote host, it should be understood that different embodiments are possible. For example, the connection management proxy 614 may be a free-standing network entity in communication with the remote host 612. Furthermore, some elements of the connection management proxy 614 could be located at the remote host 612 while others could be located at an external entity.

As explained earlier in relation to FIG. 3, rather than being located at a local LAN, the client terminal 602 in FIG. 6 communicates with the gateway 604 via the remote host 612 by creating a TCP connection to the remote host 612, with the remote host 612 providing a communication path for any data being sent between the client terminal 602 and the gateway 604. In the embodiment illustrated in FIG. 6, when the client terminal 602 receives any data from the gateway 604, such as subscription data as well as other downloads that are used to enable a trader at the client terminal 602 to receive desired data from an exchange, the remote host 612 receives the data before anything is sent out to the client terminal 602. Thus, the remote host 612 can store any preconfigured data before providing it to the client terminal 602. As other data is sent to or from the client terminal 602 during a trading session, all data is forwarded through the remote host 612. As the remote host 612 receives data intended for the client terminal 602, the remote host 612 stores some or all the received data, such as the initial downloads and other data throughout the trading day upon detecting that a TCP communication link has been disconnected.

As described in relation to FIG. 5, the connection management proxy 614 monitors the connection between the remote host 612 and the client terminal 602, and when the disconnect is detected, the remote host 612 may maintain a communication link and session resources created for the client terminal 602 at the gateway 604. In the trading environment illustrated in FIG. 6, the connection management proxy 614 may detect that a connection to the client terminal has been lost when it attempts to forward data to the client terminal 602 and receives an error message or yet some other message that is generated upon a delivery failure. As explained earlier, to maintain the communication link created for the client terminal at the gateway 604, the connection management proxy 614 may send heartbeat messages on behalf of the client terminal 602 to the gateway 604 so that the communication link is maintained for a predetermined period of time. When the preset time expires and the connection between the client terminal 602 and the remote host 612 is not reestablished, the communication resources created for the client terminal 602 at the gateway 604 are released when the connection management proxy 614 no longer sends any heartbeat messages on behalf of the client terminal 602.

Similar to the system described in FIG. 5, in addition to the initial downloads, the connection management proxy 614 may store additional data upon detecting that the TCP connection has been disconnected. The data could include order related data, such as fills, that the connection management proxy 614 may provide to the client terminal 602 upon the reconnect. The extent of data that is saved at the connection management proxy 614 may be system and configuration dependent.

III. An Example Method

Figure 7:
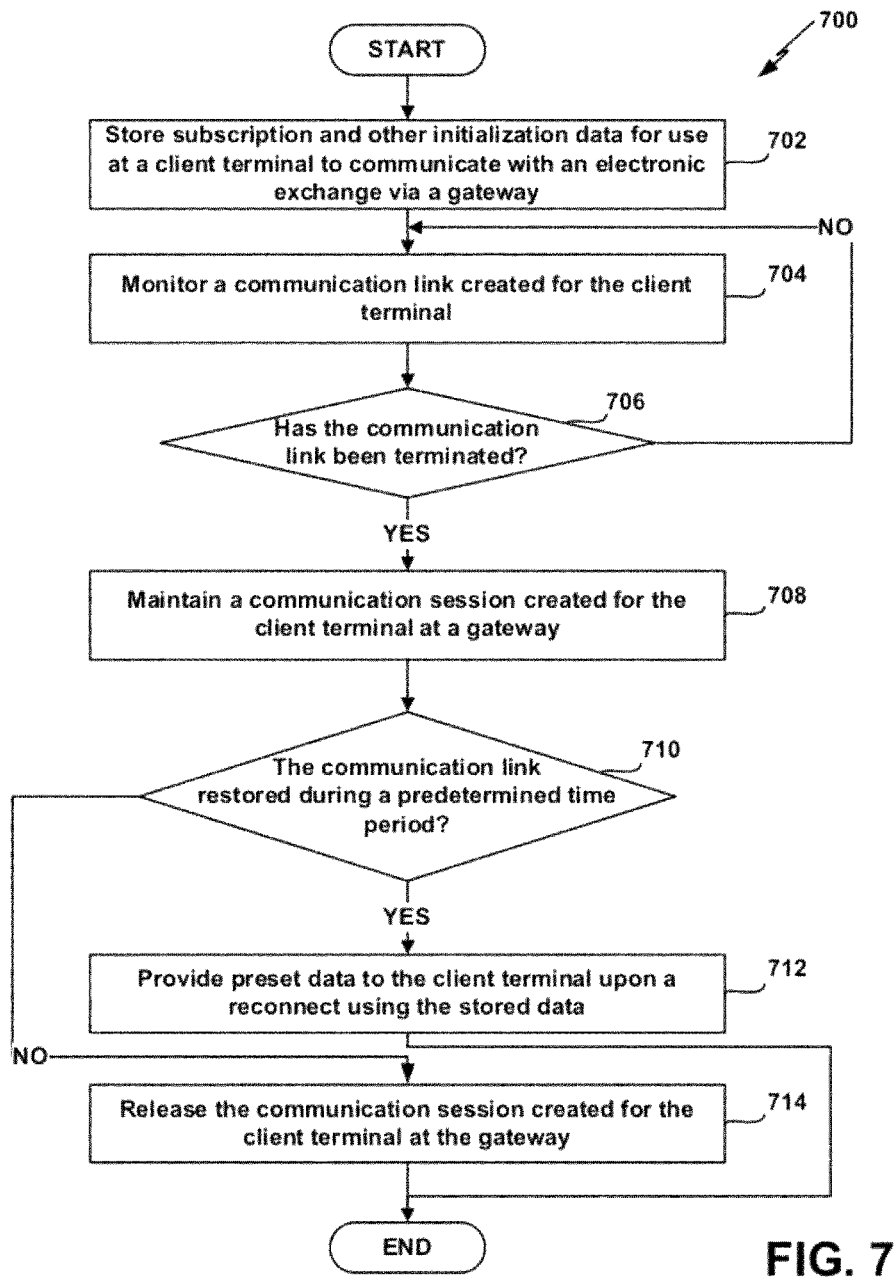
FIG. 7 is a flow diagram illustrating an example method for communication in an electronic trading environment using a connection proxy manager according to one example embodiment.

FIG. 7 is a flow diagram illustrating an example method for communication in an electronic trading environment using a connection proxy. It should be understood that each block in this flow diagram may represent a module, segment, or portion of code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

Referring now to FIG. 7, at step 702, a connection management proxy stores subscription and other initialization data for use at a client terminal to communicate with an electronic exchange via a gateway. The stored data includes product tables, subscription data as well as other data types described earlier. It should be understood that the connection management proxy may receive the data either before, after, or at the time when it is sent to the client terminal.

At step 704, the connection management proxy starts monitoring a communication link created between the client terminal and a gateway. The step of monitoring may involve listening to heartbeat signals from the client terminal or periodically sending status request messages from the connection proxy manager to the client terminal.

At step 706, during the process of monitoring the communication link between the client terminal and the gateway, the connection proxy manager determines if the communication link has been terminated. If not, the method continues at step 704. If the connection proxy manager detects that the communication link has been disconnected, at step 708, the connection proxy manager maintains communication sessions as well as other resources created for the client terminal at the gateway. According to one example embodiment described earlier, the connection proxy manager may send heartbeat messages to the gateway on behalf of the client terminal so that any API connections as well as other resources saved at the gateway for the client terminal are not released. However, different embodiments are possible as well in an environment where messages different than heartbeat messages are used by status applications.

At step 710, the communication proxy manager determines whether the client terminal initiated the process of reestablishing a communication link to the gateway during a predetermined period of time. According to one example embodiment, the communication proxy manager initiates this process after it detects the termination of the communication link between the client terminal and the gateway, and the process continues for the predetermined period of time defined with respect to the client terminal. If at any time during the predefined time period the connection proxy manager detects that the communication link has been reestablished, the connection proxy manager sends the stored initialization, subscription, as well as other data to the client terminal, as shown at 712. Depending on the system configuration, if there is any data being stored at the communication proxy manager for the client terminal during the time when the connection is lost, such data could be sent to the client terminal as well. It should be understood that the communication proxy manager may send the data to an IP address of the client terminal.

Referring back to step 714, if the communication link is not restored during the predefined time period, the communication proxy manager initiates the process of releasing a communication session as well as any resources stored at the gateway for the client terminal.

It will be apparent to those of ordinary skill in the art that the methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed:

1. A system for an improved communication in an electronic trading environment, the system comprising:
   a connection proxy,
   wherein the connection proxy is adapted to receive initial download data, wherein the initial download data enables a client terminal to connect to an electronic exchange through an intermediary device, wherein the client terminal communicates with the electronic exchange using a communication session established for the client terminal at the intermediary device,
   wherein the connection proxy is adapted to detect that a network communication link between the client terminal and the intermediary device has been terminated,
   wherein the connection proxy is adapted to provide a signal to the intermediary device to maintain the communication session at the intermediary device for a predetermined period of time in response to detecting that the network communication link has been terminated,
   wherein the connection proxy is adapted to receive market data related to a tradeable object during the predetermined period of time,
   wherein the connection proxy is adapted to provide the initial download data and the market data related to the tradeable object to the client terminal if the network communication link between the client terminal and the intermediary device is restored during the predetermined period of time, and
   wherein the connection proxy is adapted to terminate the signal being provided if the network communication link between the client terminal and the intermediary device is not restored during the predetermined period of time.

2. The system of claim 1, wherein the initial download data comprises initialization data.

3. The system of claim 1, wherein the initial download data comprises subscription data.

4. The system of claim 1, wherein the initial download data comprises data related to at least one tradeable object being traded at the electronic exchange.

5. The system of claim 1,
   wherein the connection proxy is adapted to update the initial download data during a trading day.

6. The system of claim 1,
   wherein the connection proxy is adapted to receive trade order data during the predetermined period of time, and
   wherein the connection proxy is adapted to send the trade order data to the client terminal upon detecting that the network communication link between the client terminal and the intermediary device is restored during the predetermined period of time.

7. The system of claim 6, wherein the trade order data comprises fill order data.

8. The system of claim 6, wherein the trade order data comprises order confirmation data.

9. The system of claim 1,
   wherein the connection proxy is adapted to store the initial download data.

10. The system of claim 1, wherein the tradeable object was subscribed to by the client terminal prior to detecting that the network communication link has been terminated.

11. The system of claim 1, wherein, to provide a signal to the intermediary device, the connection proxy is adapted to:

generate a heartbeat message on behalf of the client terminal; and provide the heartbeat message to the intermediary device at predefined time intervals during the predetermined period of time.

12. The system of claim 11, wherein the connection proxy is adapted to provide a signal to terminate the communication session at the intermediary device.

13. The system of claim 1, wherein the connection proxy is located at the intermediary device.

14. The system of claim 1, wherein the connection proxy is in communication with the intermediary device.

15. The system of claim 1, wherein the connection proxy is adapted to detect that the network communication link has been restored during the predetermined period of time.

16. The system of claim 1, wherein the connection proxy is adapted to detect that the network communication link has not been restored during the predetermined period of time.

17. The system of claim 1, wherein the intermediary device comprises a gateway.

* * * * *